United States Patent
Shapiro et al.

(10) Patent No.: US 7,946,801 B2
(45) Date of Patent: May 24, 2011

(54) MULTI-SOURCE GAS TURBINE COOLING

(75) Inventors: Jason David Shapiro, Methuen, MA (US); David Allen Flodman, Rowley, MA (US); Samuel Ross Rulli, Gloucester, MA (US); Samir Dimitri Sayegh, Melrose, MA (US); Norman Clement Brackett, North Reading, MA (US)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 11/965,402

(22) Filed: Dec. 27, 2007

(65) Prior Publication Data

US 2010/0281879 A1   Nov. 11, 2010

(51) Int. Cl.
*F01D 5/08* (2006.01)
(52) U.S. Cl. ............................. 415/1; 415/115; 416/97 R
(58) Field of Classification Search .............. 415/1, 115, 415/116; 416/1, 97 R
See application file for complete search history.

(56) References Cited

U.S. PATENT DOCUMENTS

| 5,120,192 | A | | 6/1992 | Ohtomo et al. | |
|---|---|---|---|---|---|
| 5,320,483 | A | * | 6/1994 | Cunha et al. | 415/114 |
| 5,340,274 | A | * | 8/1994 | Cunha | 415/115 |
| 5,711,650 | A | * | 1/1998 | Tibbott et al. | 415/115 |
| 6,315,518 | B1 | * | 11/2001 | Uematsu et al. | 415/115 |
| 6,416,284 | B1 | | 7/2002 | Demers et al. | |
| 6,422,810 | B1 | * | 7/2002 | Burdgick et al. | 415/115 |
| 6,454,526 | B1 | * | 9/2002 | Cunha et al. | 415/115 |
| 2003/0131980 | A1 | | 7/2003 | DeMarche et al. | |
| 2003/0180141 | A1 | | 9/2003 | Kress et al. | |
| 2004/0022630 | A1 | | 2/2004 | Tiemann | |
| 2004/0170498 | A1 | | 9/2004 | Peterman et al. | |

* cited by examiner

*Primary Examiner* — Igor Kershteyn
(74) *Attorney, Agent, or Firm* — Trego, Hines & Ladenheim, PLLC

(57) ABSTRACT

A cooling arrangement for a gas turbine engine includes: (a) a turbine nozzle having: (i) spaced-apart arcuate inner and outer bands; and (ii) a hollow, airfoil-shaped turbine vane extending between the inner and outer bands, the vane disposed in a primary flowpath of the engine; (b) a supporting structure coupled to the outer band such that an outer band cavity is defined between the outer band and the stationary structure; (c) a first conduit passing through the outer band cavity and communicating with the interior of the vane, the first conduit coupled to a first source of cooling air within the engine; and (d) a second conduit communicating with the outer band cavity, the second conduit coupled to a second source of cooling air within the engine.

19 Claims, 3 Drawing Sheets

MULTI-SOURCE GAS TURBINE COOLING

BACKGROUND OF THE INVENTION

This invention relates generally to gas turbine engine turbines and more particularly to methods for cooling turbine sections of such engines.

A gas turbine engine includes a turbomachinery core having a high pressure compressor, a combustor, and a high pressure or gas generator turbine in serial flow relationship. The core is operable in a known manner to generate a primary gas flow. In a turbojet or turbofan engine, the core exhaust gas is directed through an exhaust nozzle to generate thrust. A turboshaft engine uses a low pressure or "work" turbine downstream of the core to extract energy from the primary flow to drive a shaft or other mechanical load.

The gas generator turbine includes annular arrays of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life. Typically, the air used for cooling is extracted from one or more points in the compressor. These bleed flows represent a loss of net work output and/or thrust to the thermodynamic cycle. They increase specific fuel consumption (SFC) and are generally to be avoided as much as possible.

Typical prior art two stage turbines use high pressure compressor discharge air (referred to as "CDP air") to cool the first stage turbine nozzle and first stage shroud, and lower pressure inter-stage or impeller tip bleed to cool the second stage turbine nozzle and second stage turbine shroud. In this case, no distinction is made between the nozzle airfoil and the nozzle cavities, even though these areas have different requirements for cooling air pressure and flow. This results in bleed air losses that are greater than the minimum required.

BRIEF SUMMARY OF THE INVENTION

These and other shortcomings of the prior art are addressed by the present invention, which provides a cooling arrangement that uses CDP air only where required in the turbine, while using a lower pressure source in other areas.

According to one aspect, a cooling arrangement for a gas turbine engine includes: (a) a turbine nozzle having: (i) spaced-apart arcuate inner and outer bands; and (ii) a hollow, airfoil-shaped turbine vane extending between the inner and outer bands, the vane disposed in a primary flowpath of the engine; (b) a supporting structure coupled to the outer band such that an outer band cavity is defined between outer band and the stationary structure; (c) a first conduit passing through the outer band cavity and communicating with the interior of the vane, the first conduit coupled to a first source of cooling air within the engine; and (d) a second conduit communicating with the outer band cavity, the second conduit coupled to a second source of cooling air within the engine.

According to another aspect of the invention a method is provided for cooling a turbine section of a gas turbine engine which includes a turbine nozzle comprising a hollow, airfoil-shaped turbine vane extending into a primary flowpath of the engine, and an outer band cavity not in the primary flowpath and isolated from an interior of the turbine vane. The method includes: (a) directing cooling air from a first source to the interior of the vane; and (b) directing cooling air from a second source to the outer band cavity, wherein the second source is at a substantially lower pressure than the first source.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
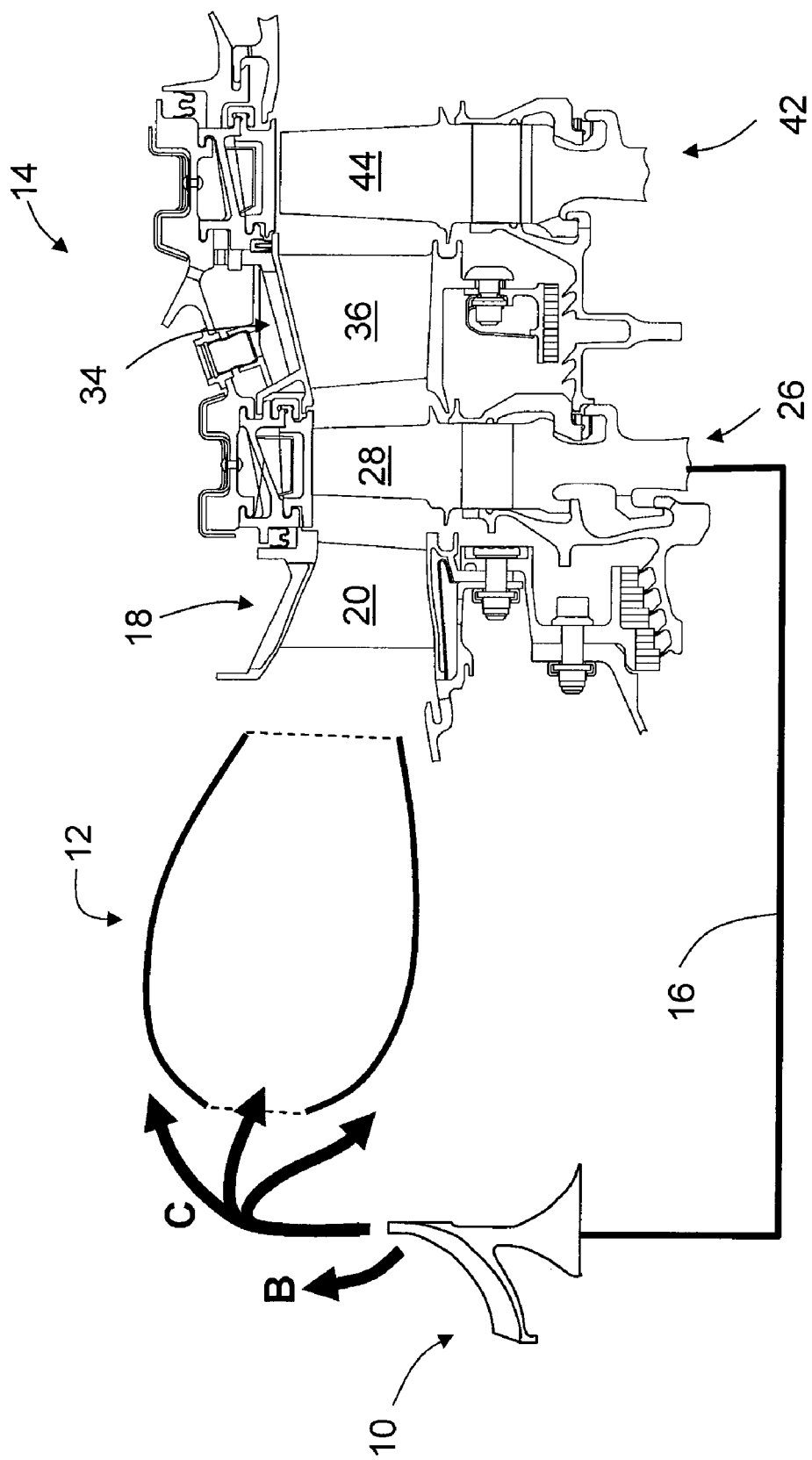
FIG. 1 a schematic cross-sectional view of a gas generator core of a turbine engine constructed in accordance with the present invention.
Figure 2:
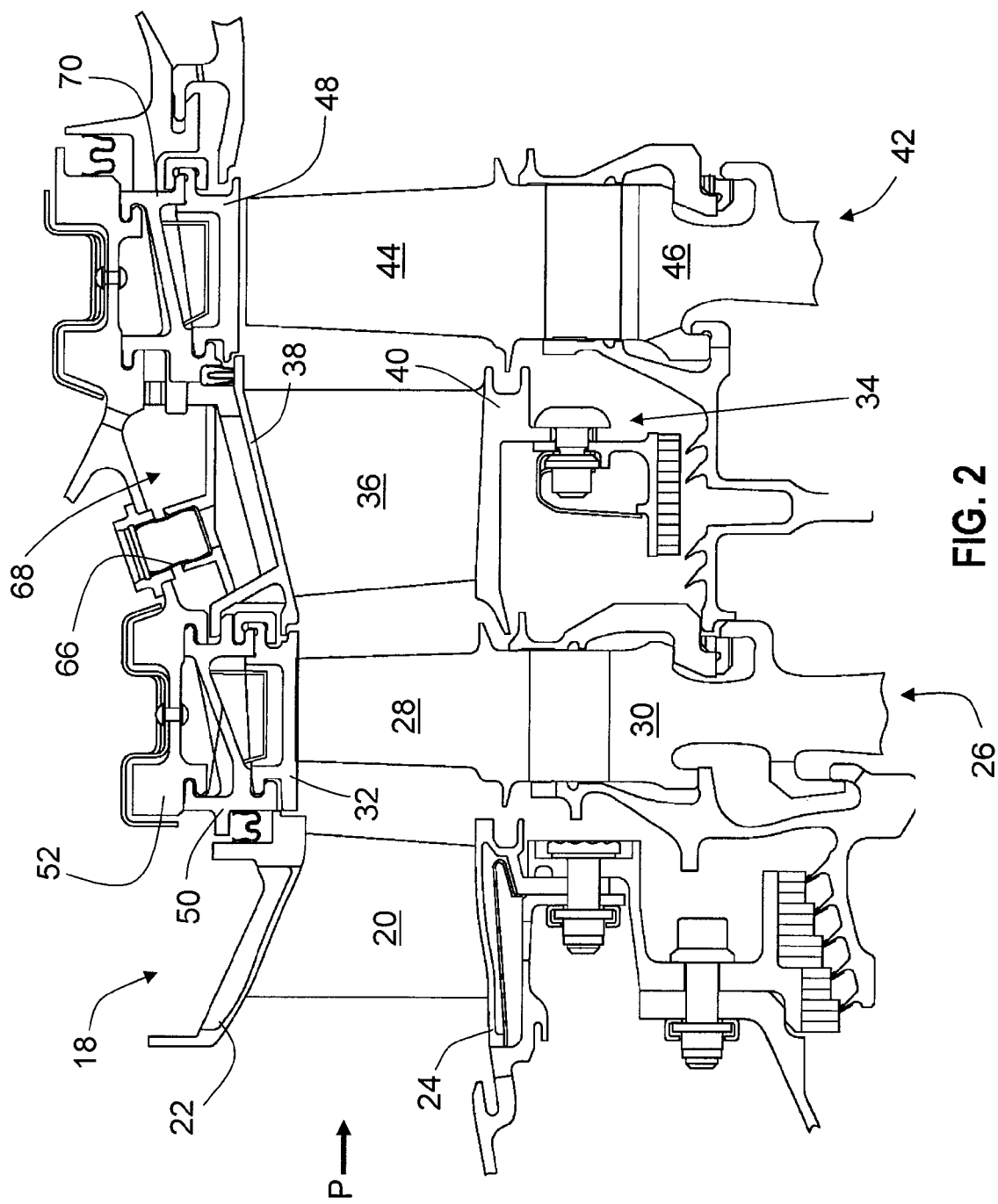
FIG. 2 is an enlarged view of a turbine section shown in FIG. 1.

Referring to the drawings wherein identical reference numerals denote the same elements throughout the various views, FIGS. 1 and 2 depict a portion of a gas turbine engine having, among other structures, a compressor 10, a combustor 12, and a gas generator turbine 14. The compressor 10 provides compressed air that passes primarily into the combustor 12 to support combustion and partially around the combustor 12 where it is used to cool both the combustor liners and turbomachinery further downstream. Fuel is introduced into the forward end of the combustor 12 and is mixed with the air in a conventional fashion. The resulting fuel-air mixture is ignited for generating hot combustion gases. The hot combustion gases are discharged to the gas generator turbine 14 where they are expanded so that energy is extracted. The gas generator turbine 14 drives the compressor 10 through a shaft 16 which is shown schematically. In this example, the only part of the compressor 10 that is shown is a final stage mixed-flow impeller; it will be understood that one or more compressor stages (axial, centrifugal, or mixed-flow) may be located upstream of the impeller.

In the illustrated example, the engine is a turboshaft engine and a work turbine would be located downstream of the gas generator turbine 14 and coupled to an output shaft. However, the principles described herein are equally applicable to turboprop, turbojet, and turbofan engines, as well as turbine engines used for other vehicles or in stationary applications.

The gas generator turbine 14 includes a first stage nozzle 18 which comprises a plurality of circumferentially spaced airfoil-shaped hollow first stage vanes 20 that are supported between an arcuate, segmented first stage outer band 22 and an arcuate, segmented first stage inner band 24. The first stage vanes 20, first stage outer band 22 and first stage inner band 24 are arranged into a plurality of circumferentially adjoining nozzle segments that collectively form a complete 360° assembly. The first stage outer and inner bands 22 and 24 define the outer and inner radial flowpath boundaries, respectively, for the hot gas stream flowing through the first stage nozzle 18. The first stage vanes 20 are configured so as to optimally direct the combustion gases to a first stage rotor 26.

The first stage rotor 26 includes a array of airfoil-shaped first stage turbine blades 28 extending outwardly from a first stage disk 30 that rotates about the centerline axis of the engine. A segmented, arcuate first stage shroud 32 is arranged so as to closely surround the first stage turbine blades 28 and thereby define the outer radial flowpath boundary for the hot gas stream flowing through the first stage rotor 26.

A second stage nozzle 34 is positioned downstream of the first stage rotor 26, and comprises a plurality of circumferentially spaced airfoil-shaped hollow second stage vanes 36 that are supported between an arcuate, segmented second stage outer band 38 and an arcuate, segmented second stage inner band 40. The second stage vanes 36, second stage outer band 38 and second stage inner band 40 are arranged into a plurality of circumferentially adjoining nozzle segments that collectively form a complete 360° assembly. The second stage outer and inner bands 38 and 40 define the outer and inner radial flowpath boundaries, respectively, for the hot gas stream flowing through the second stage turbine nozzle 34. The second stage vanes 36 are configured so as to optimally direct the combustion gases to a second stage rotor 42.

The second stage rotor 42 includes a radially array of airfoil-shaped second stage turbine blades 44 extending radially outwardly from a second stage disk 46 that rotates about the centerline axis of the engine. A segmented arcuate second stage shroud 48 is arranged so as to closely surround the second stage turbine blades 44 and thereby define the outer radial flowpath boundary for the hot gas stream flowing through the second stage rotor 42.

Figure 3:
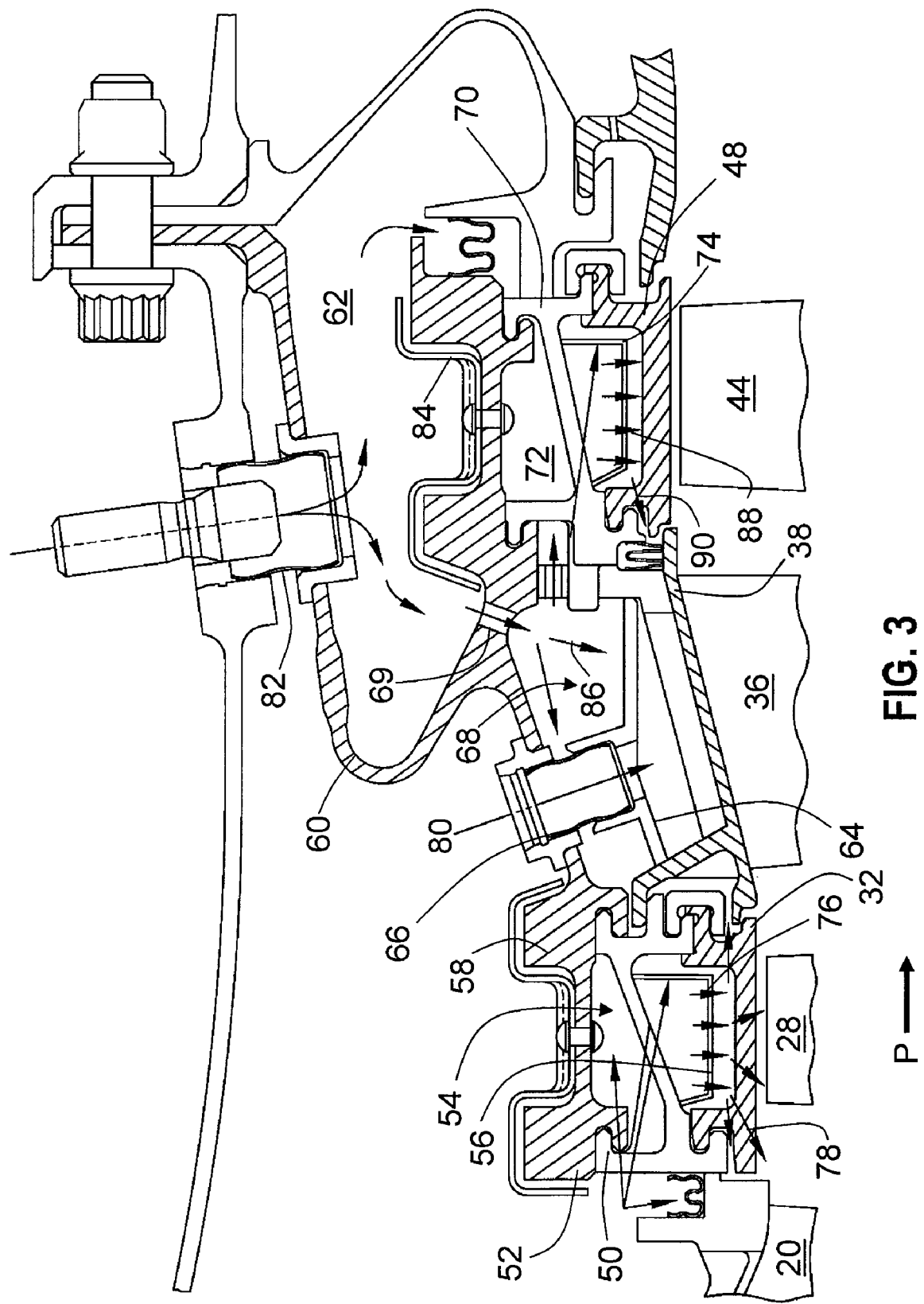
FIG. 3 is an enlarged view of a portion of the turbine section of FIG. 1.

FIGS. 2 and 3 illustrate in more detail how the components of the gas generator turbine 14 are supported. The segments of the first stage shroud 32 are supported by an array of arcuate first stage shroud hangers 50 that are in turn carried by an annular shroud support 52, for example using the illustrated hooks, rails, and C-clips in a known manner. A first stage shroud plenum 54 is defined between the shroud support 52 and the first stage shroud 32. The first stage shroud plenum 54 contains a first stage hanger baffle 56 that is pierced with impingement cooling holes in a known manner. The shroud support 52 includes a main body 58 and an aft-extending arm 60. Collectively the arm 60 and other stationary structure define an outer plenum 62.

The second stage nozzle 34 is connected to the shroud support 52 via the first stage shroud hangers 50 and second stage shroud hangers 70 (discussed below). Each second stage vane 36 is hollow so as to be able to receive cooling air in a known fashion. Its radially outer end is closed by a manifold cover 64 which is coupled to a generally cylindrical tube or conduit known as a forward "spoolie" 66. The forward spoolie 66 penetrates the main body 58 of the shroud support 52 to provide a pathway for cooling air into the interior of the second stage vanes 36, as described in more detail below. Collectively, the second stage outer band 38, the manifold cover 64, the shroud support 52, and the forward spoolie 66 define an outer band cavity 68 which communicates with the outer plenum 62 through one or more cooling passages 69 formed in the main body 58.

The segments of the second stage shroud 48 are supported by an array of arcuate second stage shroud hangers 70 that are in turn carried by the shroud support 52, for example using the illustrated hooks, rails, and C-clips in a known manner. A second stage shroud plenum 72 is defined between the shroud support 52 and the second stage shroud 48, and contains a second stage hanger baffle 74 that is pierced with impingement cooling holes in a known manner the second stage shroud plenum 72 communicates with the outer band cavity 68 through openings formed in the second stage outer band 38 and the second stage hanger 70.

Cooling air for the gas generator turbine 14 is provided from two sources. First, some of the compressor discharge air (CDP), at the highest pressure in the compressor 10, which feeds the combustor 12, is bleed off for cooling use. The CDP air is depicted by the arrows labeled "C" in FIG. 1. Secondly, air from a lower-pressure source such as an intermediate compressor stage or impeller tip bleed air, is used. Tip bleed air is depicted schematically by the arrow labeled "B" in FIG. 1.

FIG. 3 illustrates the cooling pathways in the gas generator turbine 14 in detail. The air from these two sources is routed to the gas generator turbine 14 as follows. The first stage turbine blades 20 are cooled in a conventional manner. CDP air is provided to the first stage shroud plenum 54. This air impinges on the backside of the first stage shroud 32 as shown by the arrows 76, and then exits into the engine's primary flowpath "P" through film cooling holes as shown by the arrows 78. CDP air is also provided to the interior of the first stage vanes 20 through the forward spoolie 66 (see arrow 80) where is it used for convection cooling, impingement cooling, film cooling, or combinations thereof before exiting to the primary flowpath P.

The lower pressure bleed air (e.g. impeller tip bleed air) is provided to the outer plenum 62 through a generally cylindrical tube or conduit referred to as an "aft spoolie" 82. The aft spoolie 82 may be fed with pipes, tubes, etc. of a known type (not shown). An annular heat shield 84 is positioned in the outer plenum 62 above the second stage shroud 48. This protects the thermal mass of the second stage shroud 48 from the tip flow to improve clearance control. Its presence also helps to distribute the flow about the circumference of the outer plenum 62.

The bleed air passes into the outer band cavity 68 through the cooling passages 69, as shown by the arrows 86. Here, it purges the outer band cavity 68 to remove any stagnant high-temperature air, and also pressurizes the outer band cavity 68 to deter leakage of combustion gases from the primary flowpath P into the outer band cavity 68 through gaps (not shown) in the "split lines" between individual segments of the second stage outer band 38.

Subsequently, the bleed air flows into the second stage shroud plenum 72. This air impinges on the backside of the second stage shroud 48 as shown by the arrows 88, and then exits into the engine's primary flowpath "P" through exit holes as shown by the arrows 90.

The cooling arrangement described that uses CDP air only where required in the gas generator turbine, while using a lower pressure source in other areas. This optimizes the cooling and pressure requirements of each component while reducing the amount of cooling flow and leakages.

The foregoing has described cooling arrangements for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A cooling arrangement for a gas turbine engine, comprising:
    (a) a turbine nozzle comprising:
        (i) spaced-apart arcuate inner and outer bands; and
        (ii) a hollow, airfoil-shaped turbine vane extending between the inner and outer bands, the vane disposed in a primary flowpath of the engine;
    (b) a supporting structure coupled to the outer band such that an outer band cavity is defined between the outer band and the supporting structure;
    (c) a first conduit passing through the outer band cavity and communicating with the interior of the vane, the first conduit coupled to a first source of cooling air within the engine; and (d) a second conduit communicating with the outer band cavity, the second conduit coupled to a second source of cooling air within the engine.

2. The cooling arrangement of claim 1 further comprising:
   (a) an annular turbine shroud coupled to the supporting structure downstream of the outer band, the turbine shroud having a first surface exposed to the primary flowpath, and an opposed second surface, the supporting structure and second surface cooperatively defining a shroud plenum; and
   (b) a flowpath connecting the outer band cavity of the turbine nozzle and the shroud plenum.

3. The cooling arrangement of claim 2 wherein a baffle pierced with impingement cooling holes is disposed in the shroud plenum.

4. The cooling arrangement of claim 2 wherein the shroud includes at least one exit hole communicating with the shroud plenum and the primary flowpath.

5. The cooling arrangement of claim 2 wherein the supporting structure is an annular shroud support which includes:
   (a) an annular main body; and
   (b) an annular, generally axially-extending arm which is spaced-apart from the main body such that the main body and the arm define an annular outer plenum therebetween.

6. The cooling arrangement of claim 5 wherein:
   (a) the second conduit passes through the arm so as to communicate with the outer plenum; and
   (b) a cooling passage in the main body interconnects the outer plenum and the outer band cavity.

7. The cooling arrangement of claim 6 wherein a heat shield is carried by the main body in a position between the second conduit and the turbine shroud.

8. The cooling arrangement of claim 1 wherein the first source is a final stage of a compressor of the engine.

9. The cooling arrangement of claim 1 wherein the first source is an intermediate stage of a compressor of the engine.

10. The cooling arrangement of claim 1 wherein the first source is a tip of a compressor impeller of the engine.

11. A method of cooling a turbine section of a gas turbine engine which includes a turbine nozzle comprising a hollow, airfoil-shaped turbine vane extending into a primary flowpath of the engine, and an outer band cavity not in the primary flowpath and isolated from an interior of the turbine vane, the method comprising:
   (a) directing cooling air from a first source to the interior of the vane; and
   (b) directing cooling air from a second source to the outer band cavity, wherein the second source is at a substantially lower pressure than the first source.

12. The method of claim 11 wherein an annular turbine shroud is disposed downstream of the outer band, the turbine shroud having a first surface exposed to the primary flowpath, and an opposed second surface which is exposed to a shroud plenum; the method further comprising passing cooling air from the outer band cavity of the turbine nozzle to the shroud plenum.

13. The method of claim 12 further comprising impingement cooling the second surface using cooling air from the shroud plenum.

14. The method of claim 12 further comprising passing spent cooling air from the shroud plenum to the primary flowpath.

15. The method of claim 12 wherein:
   (a) an annular shroud support is disposed radially outward of the turbine nozzle and the turbine shroud, which includes:
      (i) an annular main body; and
      (ii) an annular, generally axially-extending arm which is spaced-apart from the main body such that the main body and the arm define an annular outer plenum therebetween; and
   (b) cooling air is from the second source is first introduced into the outer plenum and then transferred to the outer band cavity.

16. The method of claim 15 wherein cooling air from the second source impinges on a heat shield positioned in the outer plenum so as to protect the turbine shroud.

17. The method of claim 11 wherein the first source is a final stage of a compressor of the engine.

18. The method of claim 11 wherein the first source is an intermediate stage of a compressor of the engine.

19. The method of claim 11 wherein the first source is a tip bleed of a compressor impeller of the engine.

* * * * *